(12) United States Patent
Joly et al.

(10) Patent No.: US 8,697,789 B2
(45) Date of Patent: Apr. 15, 2014

(54) ADHESIVES COMPRISING POLY(ISOBUTYLENE) POLYMERS AND UNREACTED ALKYL AMINE

(75) Inventors: Guy D. Joly, Shoreview, MN (US); Sarah J. Moench, Rochester, MN (US); Leon Levitt, Mendota Heights, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 88 days.

(21) Appl. No.: 13/488,506

(22) Filed: Jun. 5, 2012

(65) Prior Publication Data

US 2013/0324651 A1 Dec. 5, 2013

(51) Int. Cl.
*C08K 5/00* (2006.01)
*C08K 5/16* (2006.01)

(52) U.S. Cl.
USPC .......................................... 524/236; 524/186

(58) Field of Classification Search
USPC ....................................................... 524/236
See application file for complete search history.

(56) References Cited

U.S. PATENT DOCUMENTS

| | | | |
|---|---|---|---|
| 3,410,717 A * | 11/1968 | Hirsch | 428/355 BL |
| 4,657,958 A * | 4/1987 | Fieldhouse et al. | 524/247 |
| 5,459,174 A | 10/1995 | Merrill | |
| 5,602,221 A | 2/1997 | Bennett | |
| 2003/0080005 A1* | 5/2003 | Toussant et al. | 206/225 |
| 2012/0118469 A1 | 5/2012 | Joly | |
| 2012/0122359 A1 | 5/2012 | Lee | |
| 2012/0123011 A1 | 5/2012 | Lee | |

FOREIGN PATENT DOCUMENTS

| | | |
|---|---|---|
| CA | 1278131 | 12/1990 |
| GB | 859728 * | 1/1961 |
| WO | WO 2011/062851 | 5/2011 |
| WO | WO 2011/062852 | 5/2011 |
| WO | WO 2012/044417 | 4/2012 |
| WO | WO 2012/074733 | 6/2012 |
| WO | Wo 2012/112303 | 8/2012 |

OTHER PUBLICATIONS

Technical data sheet of Vistanex LM-MS by BASF, Oct. 2013.*
Technical data sheet of Vistanex L-80 by ExxonMobil, Oct. 2013.*
International Search Report PCT/US2013/042337 Jul. 24, 2013, 3 pages.

* cited by examiner

*Primary Examiner* — Hui Chin
(74) *Attorney, Agent, or Firm* — Carolyn A. Fischer

(57) ABSTRACT

Presently described is an adhesive composition comprising at least one isobutylene polymer and an alkyl amine adhesion promoting agent. The alkyl amine is unreactive with respect to the isobutylene polymer. In favored embodiments, the alkyl amine adhesion promoting agent comprises an alkyl group having 6-24 carbon atoms. Further, the isobutylene polymer is a non-halogenated copolymer or homopolymer. Also described are adhesive articles a pressure sensitive adhesive, as described herein on a backing. The adhesive is particularly suitable for articles intended for use in a wet environment such as kitchen or bath articles.

16 Claims, No Drawings

ADHESIVES COMPRISING POLY(ISOBUTYLENE) POLYMERS AND UNREACTED ALKYL AMINE

SUMMARY

Presently described is an adhesive composition comprising at least one isobutylene polymer and an alkyl amine adhesion promoting agent. The alkyl amine is unreactive with respect to the isobutylene polymer. In favored embodiments, the alkyl amine adhesion promoting agent comprises an alkyl group having 6-24 carbon atoms. Further, the isobutylene polymer is a non-halogenated copolymer or homopolymer.

Also described are adhesive articles a pressure sensitive adhesive, as described herein on a backing. The adhesive is particularly suitable for articles intended for use in a wet environment such as kitchen or bath articles.

DETAILED DESCRIPTION

The invention described herein relates to adhesives prepared from isobutylene polymers, and articles comprising a pressure-sensitive adhesive layer.

The polyisobutylene material is typically prepared by polymerizing isobutylene alone or by polymerizing isobutylene plus additional ethylenically unsaturated monomers, such as isoprene, butadiene, or a combination thereof in the presence of a Lewis Acid catalyst such as aluminum chloride, boron trichloride (with titanium tetrachloride as a co-catalyst), or boron trifluoride. Copolymers are typically random copolymers. However, block copolymers could alternatively be utilized.

The isobutylene copolymers are generally synthetic rubbers having a polyisobutylene main chain. In some embodiments, the isobutylene polymer is an isobutylene copolymer, i.e. synthetic rubbers wherein isobutylene is copolymerized with another monomer. Such synthetic rubbers include butyl rubbers which are copolymers of mostly isobutylene with a small amount of alkylene, such as isoprene, for example, butyl rubbers available under the tradenames VISTANEX (Exxon Chemical Co.) and JSR BUTYL (Japan Butyl Co., Ltd.). Synthetic rubbers also include copolymers of mostly isobutylene with n-butene or butadiene.

Polyisobutylene copolymers may also comprise paramethylstyrene monomer units.

In some embodiments, the weight average molecular weight ($M_w$) of the isobutylene copolymer is at least 25,000 grams per mole, at least 50,000 grams per mole, at least 100,000 grams per mole, or at least 150,000 grams per mole. In some embodiments, the weight average molecular weight is typically no greater than 4,000,000 g/mole or 3,000,000 g/mole, or 2,000,000 g/mole, or 1,000,000 g/mole, or 500,000 g/mole.

Homopolymers are commercially available, for example, under the trade designation OPPANOL (e.g., OPPANOL B10, B15, B30, B50, B80, B100, B150, and B200) from BASF Corp. (Florham Park, N.J.). These polymers often have a weight average molecular weight ($M_w$) in the range of about 35,000 to 4,500,000 grams per mole.

Still other exemplary homopolymers are commercially available from United Chemical Products (UCP) of St. Petersburg, Russia in a wide range of molecular weights. For example, homopolymers commercially available from UCP under the trade designation SDG have a viscosity average molecular weight ($M_v$) in the range of about 35,000 to 65,000 grams per mole. Homopolymers commercially available from UCP under the trade designation EFROLEN have a viscosity average molecular weight ($M_v$) in the range of about 480,000 to about 4,000,000 grams per mole. Homopolymers commercially available from UCP under the trade designation JHY have a viscosity average molecular weight in the range of about 3000 to about 55,000 grams per mole. These homopolymers typically do not have reactive double bonds that form covalent bonds via free-radical polymerization.

The weight average molecular weight of the OPPANOL polymers utilized in the illustrative examples are as follows:

| | | |
|---|---|---|
| B30 | 200,000 | (soft, resinous) |
| B50 | 340,000 | (rubbery) |
| B100 | 1,100,00 | (rubbery) |
| B150 | 2,500,000 | (rubbery) |

In some embodiments, the adhesive comprises a mixture of a first, higher molecular weight polyisobutylene polymer and a second, lower molecular weight polyisobutylene polymer. The adhesive comprises at least 5, 10 or 15 wt-% and typically no greater than about 30 wt-% or 25 wt-% of a first high molecular weight polyisobutylene polymer, such as a homopolymer, having a molecular weight of at least 500,000, 750,000, or 1,000,000 g/mole. In some embodiments, the molecular weight of the first polyisobutylene polymer is typically no greater than about 3,000,000 g/mole. The adhesive further comprises at least 15, 20 or 25 wt-% and typically no greater than about 40 wt-% or 35 wt-% of a second lower molecular weight polyisobutylene polymer, such as a homopolymer, having a molecular weight less than 500,000, 450,000, or 300,000 g/mole. In some embodiments, the molecular weight of the second polyisobutylene polymer is typically at least 100,000 or 150,000 g/mole.

The polyisobutylene polymer (i.e. copolymer or homopolymer) is non-halogenated as halogenated sites are reactive with amines. The polyisobutylene polymer is typically unfunctionalized, meaning is does not comprise any reactive groups inclusive of pendent halogen. However, the polyisobutylene polymer may alternatively be functionalized, provided that such functional groups are not amine-reactive functional groups.

The polyisobutylene polymer is combined with at least one alkyl amine adhesion promoting agent. The alkyl amine additive is unreactive with respect to the isobutylene polymer. The alkyl amine additive can be straight-chain, branched, or cyclic in structure. The alkyl amine can be a primary, secondary, or tertiary amine.

The primary amines have the general formula $R_1$—$NH_2$

The secondary and tertiary amines have the general formula $R_1$—$NR_2R_3$

In each of these formulas, $R_1$ is an alkyl group having at least 6, 7 or 8 carbon atoms; $R_2$ and $R_3$ are independently H with the proviso that $R_2$ and $R_3$ are not both H; a $C_1$-$C_5$ alkyl group, such as methyl; or $R_1$.

Representative alkyl amines includes for example octylamine, decylamine, dodecylamine, N-methyl-N-octadecylamine, N'N'-dimethyl-N-octadecylamine, and dioctadecylamine.

In some embodiments, $R_1$ comprises no greater than 24 carbon atoms. In some embodiments, $R_1$ is octyl, decyl, dodecyl, tetradecyl, hexadecyl, octadecyl, dioctadecyl and icosadecyl.

The concentration of alkyl amine adhesion promoting agent is typically at least 0.5, 1.0, 1.5, or 2.0 wt-% of the adhesive composition and typically no greater than 15 or 10 wt-%.

The adhesive typically comprises at least one tackifier. The tackifier can have any suitable softening temperature or softening point. The softening temperature is often less than 200° C., less than 180° C., less than 160° C., less than 150° C., less than 125° C., or less than 120° C. In applications that tend to generate heat, however, the tackifier is often selected to have a softening point of at least 75° C. Such a softening point helps minimize separation of the tackifier from the rest of the adhesive composition when the adhesive composition is subjected to heat such as from an electronic device or component. The softening temperature is often selected to be at least 80° C., at least 85° C., at least 90° C., or at least 95° C. In applications that do not generate heat, however, the tackifier can have a softening point less than 75° C.

Exemplary tackifiers include hydrocarbon resins and hydrogenated hydrocarbon resins, e.g., hydrogenated cycloaliphatic resins, hydrogenated aromatic resins, or combinations thereof. Suitable tackifiers are commercially available and include, e.g., those available under the trade designation ARKON (e.g., ARKON P or ARKON M) from Arakawa Chemical Industries Co., Ltd. (Osaka, Japan); those available under the trade designation ESCOREZ (e.g., ESCOREZ 1315, 1310LC, 1304, 5300, 5320, 5340, 5380, 5400, 5415, 5600, 5615, 5637, and 5690) from Exxon Mobil Corporation, Houston, Tex.; and those available under the trade designation REGALREZ (e.g., REGALREZ 1085, 1094, 1126, 1139, 3102, and 6108) from Eastman Chemical, Kingsport, Tenn.

The concentration of tackifier can vary depending on the intended adhesive composition. In some embodiments, the amount of tackifier is at least 5 wt.-%, 10 wt.-% or 15 wt.-%. The maximum amount of tackifier is typically no greater than 45 wt.-%, or 40 wt.-%, or 35 wt.-%, or 30 wt.-%, or 25 wt.-%. tackifying resin. For removeable masking tapes, the tackifer concentration may be no greater than about 30 wt-%. However, for other uses, higher tackifier concentrations may be favored.

Plasticizers may also be used in the adhesive formulation to provide wetting action and/or viscosity control. These plasticizers are well known in the art and may include hydrocarbon oils, liquid or soft tackifiers, including liquid hydrocarbon resins, liquid polyterpenes, liquid poly(isobutylenes) such as Glissopal™, and the like, waxes, and mixtures of oils. A plasticizer may be present in the pressure sensitive adhesive of the present invention in an amount of 1, 2, 3, 4 or 5 wt.-%, and typically no greater than 30, or 25, or 20 or 15, or 10 wt.-% of the adhesive composition.

Those skilled in the art will also know that other additives such as fillers, antioxidants, stabilizers, and colorants may be blended with the adhesive for beneficial properties.

The adhesive compositions are typically applied as a solvent solution or dispersion, the solvent evaporated, and the adhesive composition crosslinked during solvent evaporation. Suitable solvents include alkanes, toluene and tetrahydrofuran.

The adhesive compositions are coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated.

In favored embodiments, the (e.g. cured) adhesive is a pressure sensitive adhesive. According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

For example, if the glass transition temperature ($T_g$) or modulus of the elastomer is too high and above the Dahlquist criterion for tack (storage modulus of $3 \times 10^6$ dynes/cm$^2$ at room temperature and oscillation frequency of 1 Hz), the material will not be tacky and is not useful by itself as a PSA material. Often in this case, low molecular weight, high $T_g$ resin polymers (tackifiers) or low molecular weight, low $T_g$ polymers (plasticizers) are often used to modulate the $T_g$ and modulus into an optimal PSA range.

The adhesives described herein may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, ethylene vinyl acetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

The adhesives of the present disclosure are particularly useful for forming strong bonds to low surface energy (LSE) substrates. As used herein, low surface energy substrates are those having a surface energy of less than about 45 dynes per centimeter, more typically less than about 40 dynes per centimeter, and most typically less than about 35 dynes per centimeter. Included among such materials are olefin-based thermoplastics (polypropylene, polyethylene, high density polyethylene or HDPE, ethylene propylene diene monomer rubber (EPDM)), as well as polystyrene and acrylics such as poly(methyl methacrylate) (PMMA). Such material as commonly used in automotives, paints, appliances and electronics markets. Other substrates may also have properties of low surface energy due to a residue, such as an oil residue or a film such as paint, being on the surface of the substrate. However, even though the present adhesive bonds well to low surface energy surfaces, the invention is not limited to being bonded to low surface energy substrates, as it has been found that the inventive adhesive can also bond well to higher surface energy substrates such as, for example, other plastics, ceramics, glass and metals. The adhesive compositions described herein are also suitable for the medical adhesive field due to having low odor and being physiologically inert.

The pressure sensitive adhesive can exhibit various peel and shear properties (as measured according to the test methods described in the forthcoming examples), depending on the intended end use.

The pressure sensitive adhesive can exhibit a 90 degree peel value to acrylic of at least 25, 30, 35, 40, 45, 50, 55, or 60 ounces/inch. Further the pressure sensitive adhesive can exhibit a peel to porcelain and/or glass of at least 5, 10, 15 or 20 ounces/inch. Notably such 90 degree peel adhesion values can be obtained after the samples have been conditioned in a shower chamber (the details of such described in the forthcoming examples).

The substrate (to which the PSA is bonded) is selected depending on the particular application in which it is to be used. For example, the adhesive can be applied to sheeting products, (e.g., decorative graphics and reflective products), label stock, and tape backings. Additionally, the adhesive may be applied directly onto a substrate such as an automotive panel, or a glass window so that another substrate or object can be attached to the panel or window.

Due to the inclusion of the alkyl amine, the adhesive exhibits improved peel adhesion to inorganic substrates such as glass and porcelain, in combination with high adhesion to lower surface energy substrates such as acrylic, especially in wet environments. This combination of properties is amendable to bonding a variety of kitchen and especially bath articles such as bathmats, decorative items, soap trays, hooks, etc. Other adhesive articles include masking tapes, duct tapes, and labels, such as for outdoor use.

The adhesive can also be provided in the form of a pressure-sensitive adhesive transfer tape in which at least one layer of the adhesive is disposed on a release liner for application to a permanent substrate at a later time. The adhesive can also be provided as a single-coated or double-coated tape in which the adhesive is disposed on a permanent backing. Backings can be made from plastics (e.g., polypropylene, including biaxially oriented polypropylene, vinyl including ethylene vinyl acetate, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.), incorporated herein by reference.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner.

The following, non-limiting, examples further describe exemplary adhesives and adhesive articles of the present disclosure, as well as exemplary methods for making such adhesives and adhesive articles.

EXAMPLES

The following, non-limiting, examples further describe exemplary adhesives and adhesive articles of the present disclosure, as well as exemplary methods for making such adhesives and adhesive articles. All percents are by weight unless otherwise indicated. Solvents and other reagents used were obtained from Aldrich Chemical Company, Milwaukee, Wis. unless otherwise noted. As used herein, the designation PIB means polyisobutylene.

TABLE 1

Materials

| No. | Material | Function | Manufacturer |
|-----|----------|----------|--------------|
| M0 | OPPANOL ™ B30, PIB with Mw of $2.0 \times 10^5$ g/mole | Medium molecular weight PIB | BASF Corporation, Florham Park, NJ |
| M1 | OPPANOL ™ B50, PIB with Mw of $3.4 \times 10^5$ g/mole | Medium molecular weight PIB | BASF |
| M2 | OPPANOL ™ B100, PIB with Mw of $1.1 \times 10^6$ g/mole | High molecular weight PIB | BASF |
| M3 | OPPANOL ™ B150, PIB with Mw of $2.5 \times 10^6$ g/mole | High molecular weight PIB | BASF |
| M4 | ESCOREZ E5340 | Hydrogenated hydrocarbon tackfier | ExxonMobil Chemical Co., Houston, TX. |
| M5 | GLISSOPAL 1000 | Low molecular weight PIB | BASF |
| A1 | Octyl amine | Alkyl amine | Alfa Aesar |
| A2 | Decyl amine | Alkyl amine | Sigma Aldrich |
| A3 | Dodecyl amine | Alkyl amine | Sigma Aldrich |
| A4 | N-methyl-N-octadecylamine | Alkyl amine | TCI America |
| A5 | N,N-dimethyl-N-octadecylamine | Alkyl amine | TCI America |
| A6 | Dioctadecyl amine | Alkyl amine | Pfaltz and Bauer, Inc. |
| S1 | Glass, 5.08 cm × 15.2 cm × 0.635 cm | Substrate | Brin Northwestern Glass |

TABLE 1-continued

Materials

| No. | Material | Function | Manufacturer |
|---|---|---|---|
|  | (2" × 6", ¼") |  | Company, Minneapolis, MN |
| S2 | Porcelain (Marazzi Montagna Soratta porcelain tile) | Substrate | Home Depot, Atlanta, GA |
| S3 | Acrylic (ASB Firenze shower) | Substrate | Home Depot |
| S4 | Primed EVA film | Adhesive carrier | Bloomer Plastics, Bloomer, WI |
| L1 | Clearsil ® T30 release liner | Release liner | CP Films, Inc., Martinsville, VA |
| L2 | Clearsil ® T10 release liner | Release liner | CP Films, Inc. |

Examples 1-10 and Control Examples C1-C2

Polyisobutylene (PIB) solutions were prepared by dissolving isobutylene polymers M0-M3 in toluene. Solutions containing PIBs M0 and M1 were 20% solids by weight, and solutions containing PIBs M2 and M3 were 10% solids by weight.

Adhesive compositions were prepared in glass jars by mixing the PIB solutions with tackifiers, low molecular weight PIB, and alkyl amine additives to provide solutions having the solids compositions shown in Table 2. The jars capped and sealed with a TEFLON-lined metal cap, TEFLON tape, and SCOTCH BRAND electrical tape. The jars were mixed on a roller mixer for about 16 hours at ambient temperature. The adhesive solutions were then coated onto a release liner L1 using a knife coater to provide a dry adhesive coating of about 101 to about 114 micrometers. The coated liners were then taped to a thin aluminum panel and dried in an oven set at 50° C. for 15 minutes, followed by heating in an oven set at 70° C. for 30 minutes. The coated adhesive films were then conditioned in a room with 50% relative humidity and 23° C. for approximately 24 hours. Then a second release liner L2 was laminated onto the exposed adhesive and the coated adhesive was prepared for testing.

TABLE 2

Adhesive Compositions

Adhesive Composition Materials

| Ex | M0 | M1 | M2 | M3 | M4 | M5 | A1 | A2 | A3 | A4 | A5 | A6 |
|---|---|---|---|---|---|---|---|---|---|---|---|---|
| C1 | 27.5 | 27.5 | 15 |  | 25 | 5 |  |  |  |  |  |  |
| C2 |  | 20 | 30 | 20 | 27.5 | 2.5 |  |  |  |  |  |  |
| 1 | 27.5 | 27.5 | 15 |  | 27.5 |  | 2.5 |  |  |  |  |  |
| 2 | 27.5 | 27.5 | 15 |  | 27.5 |  |  | 2.5 |  |  |  |  |
| 3 | 27.5 | 27.5 | 15 |  | 27.5 |  |  |  | 2.5 |  |  |  |
| 4 |  | 20 | 30 | 20 | 27.5 |  | 2.5 |  |  |  |  |  |
| 5 |  | 20 | 30 | 20 | 27.5 |  |  | 2.5 |  |  |  |  |
| 6 |  | 20 | 30 | 20 | 27.5 |  |  |  | 2.5 |  |  |  |
| 7 |  | 20 | 30 | 20 | 27.5 |  |  |  |  | 2.5 |  |  |
| 8 |  | 20 | 30 | 20 | 27.5 |  |  |  |  |  | 2.5 |  |
| 9 |  | 20 | 30 | 20 | 25 |  |  |  |  |  | 5 |  |
| 10 |  | 20 | 30 | 20 | 27.5 |  |  |  |  |  |  | 2.5 |

To prepare the adhesive coated sample for testing, a portion of a substrate S4 measuring about 6 inches by about 18 inches was taped to a lab bench with the primed side exposed. Liner L2 was removed from the coated adhesive film and the adhesive side was carefully laid onto the substrate. A plastic card was used to squeeze out air bubbles. Tapes measuring 2.54 cm by about 46 cm were cut and then laminated at a pressure of about 413 to 551 kPa (60-80 psi). The tapes were then conditioned at ambient temperature and pressure for at least one hour before being cut into 2.54 cm by 15.2 cm long test tapes.

Test substrates (S1, S2, or S3) measuring 5.08 cm×15.2 cm were cleaned by spraying ethanol onto the surface and wiping it clean with a paper towel. The procedure was repeated 2-4 times as needed to remove surface residue, and the substrate was allowed to air dry.

Test specimens were prepared by removing liner L1 from the test tape and laminating it to a clean test substrate with 2 passes using a 4.5 lb roller. The specimens were allowed to dwell for 30 minutes at ambient temperature and then placed in an enclosed shower chamber equipped with controlled water temperature and pressure sprays. Water at a temperature of about 46.67° C. (116° F.) was sprayed onto the specimens at a pressure of about 7.25 KPa (50 psi.). The temperature measured inside the shower chamber was 35.55° C. (96° F.). The specimens were left in the shower chamber for approximately 18-24 hours, after which time they were removed and gently dried with a paper towel. Peel adhesion tests were then performed on the specimens within 5 minutes of being removed from the shower chamber.

Peel adhesion strength at an angle of 90° was determined using an IMASS SP-2000 slip/peel tester (available from IMASS, Inc., Accord, Mass.) at a peel rate of 432 mm/minute (17 inches/minute) using an 11.34 Kg (25 lb) load cell after a 2 second delay. A test specimen having a 2.54 cm (1 inch) by 15.2 cm (6 inch) test tape on a test substrate was used. The data was averaged over 20 seconds of peel time and the data, reported in ounces/inch, is the average of 2 replicates. Test results are shown Table 3.

TABLE 3

Peel adhesion test results

90° Peel Adhesion - ounce/inch

| Example | S1 - Glass | S2 - Porcelain | S3 - Acrylic |
|---|---|---|---|
| C1 | 3 | 2 | 65 |
| C2 | 1 | NT | NT |
| 1 | 18 | 17 | NT |
| 2 | 11 | 9 | NT |
| 3 | 8 | 5 | NT |
| 4 | 9 | 7 | 55 |
| 5 | 10 | 5 | 49 |
| 6 | 5 | 3 | 47 |
| 7 | 9 | 3 | 40 |
| 8 | 13 | 8 | 55 |
| 9 | 15 | 3 | 50 |
| 10 | 9 | 6 | 47 |

NT—Not tested

What is claimed is:

1. An adhesive composition comprising at least one first isobutylene polymer having a weight average molecular weight of at least 750,000 g/mole and at least one second polyisobutylene polymer having a weight average molecular weight of at least 100,000 g/mole and less than 500,000 g/mole; and an alkyl amine adhesion promoting agent; wherein the alkyl amine is unreactive with respect to the isobutylene polymer.

2. The adhesive composition of claim 1 wherein the alkyl amine adhesion promoting agent comprises an alkyl group having 6-24 carbon atoms.

3. The adhesive composition of claim 1 wherein the isobutylene polymer is a non-halogenated copolymer or homopolymer.

4. The adhesive composition of claim 1 wherein the isobutylene polymer is an unfunctionalized copolymer or homopolymer.

5. The adhesive composition of claim 1 wherein the isobutylene polymer is an unfunctionalized homopolymer.

6. The adhesive composition of claim 1 further comprising 5 to 50 wt. % of tackifier.

7. The adhesive composition of claim 1 wherein the adhesive exhibits a peel to acrylic of at least 25, 30, 35, 40, 45, 50, 55, or 60 ounces/inch.

8. The adhesive composition of claim 1 wherein the adhesive exhibits a 90 degree peel value to porcelain of at least 5, 10, 15 or 20 ounces/inch.

9. The adhesive composition of claim 1 wherein the adhesive exhibits a 90 degree peel value to porcelain glass of at least 5, 10, 15 or 20 ounces/inch.

10. The adhesive composition of claim 8 wherein the adhesive exhibits the claimed peel values after being conditioned in a shower chamber.

11. An adhesive article comprising the adhesive of claim 1 on a backing.

12. The adhesive articles of claim 11 wherein the article is for use in a wet environment.

13. The adhesive article of claim 11 wherein the article is a kitchen or bath article.

14. The adhesive composition of claim 1 wherein the adhesive composition comprises at least 10 wt. % of one or more first isobutylene polymers having a weight average molecular weight of at least 750,000 g/mole.

15. The adhesive composition of claim 1 wherein the adhesive composition comprises at least 15 wt. % of one or more second isobutylene polymers having a weight average molecular of at least 100,000 g/mole and less than 500,000 g/mole.

16. The adhesive composition of claim 1 wherein the adhesive composition comprises at least 10 wt. % of one or more first isobutylene polymers having a weight average molecular weight of at least 750,000 g/mole and at least 15 wt-% of one or more second isobutylene polymers having a weight average molecular of at least 100,000 g/mole and less than 500,000 g/mole.

* * * * *

UNITED STATES PATENT AND TRADEMARK OFFICE
CERTIFICATE OF CORRECTION

PATENT NO. : 8,697,789 B2
APPLICATION NO. : 13/488506
DATED : April 15, 2014
INVENTOR(S) : Guy Joly It is certified that error appears in the above-identified patent and that said Letters Patent is hereby corrected as shown below:

In the Specification

Column 2
Line 49, After "$R_1$-$NH_2$" insert -- . --.
Line 51, After "$R_3$" insert -- . --.
Line 62-63, Delete "icosadecyl" and insert -- icosyl --, therefor.

Column 3
Line 34, Delete "wt.-%." and insert -- wt.-% --, therefor.

Column 6
Line 12, Delete "tackfier" and insert -- tackifier --, therefor.

Column 7
Line 8, Delete "Clearsil" and insert -- Clearasil --, therefor.
Line 9, Delete "Clearsil" and insert -- Clearasil --, therefor.

In the Claims

Column 10
Line 6, In Claim 12, delete "articles" and insert -- article --, therefor.
Line 17, In Claim 15, delete "molecular" and insert -- molecular weight --, therefor.
Line 24, In Claim 16, delete "molecular" and insert -- molecular weight --, therefor.

Signed and Sealed this
Fourteenth Day of October, 2014

Michelle K. Lee
*Deputy Director of the United States Patent and Trademark Office*